Patented Jan. 2, 1951

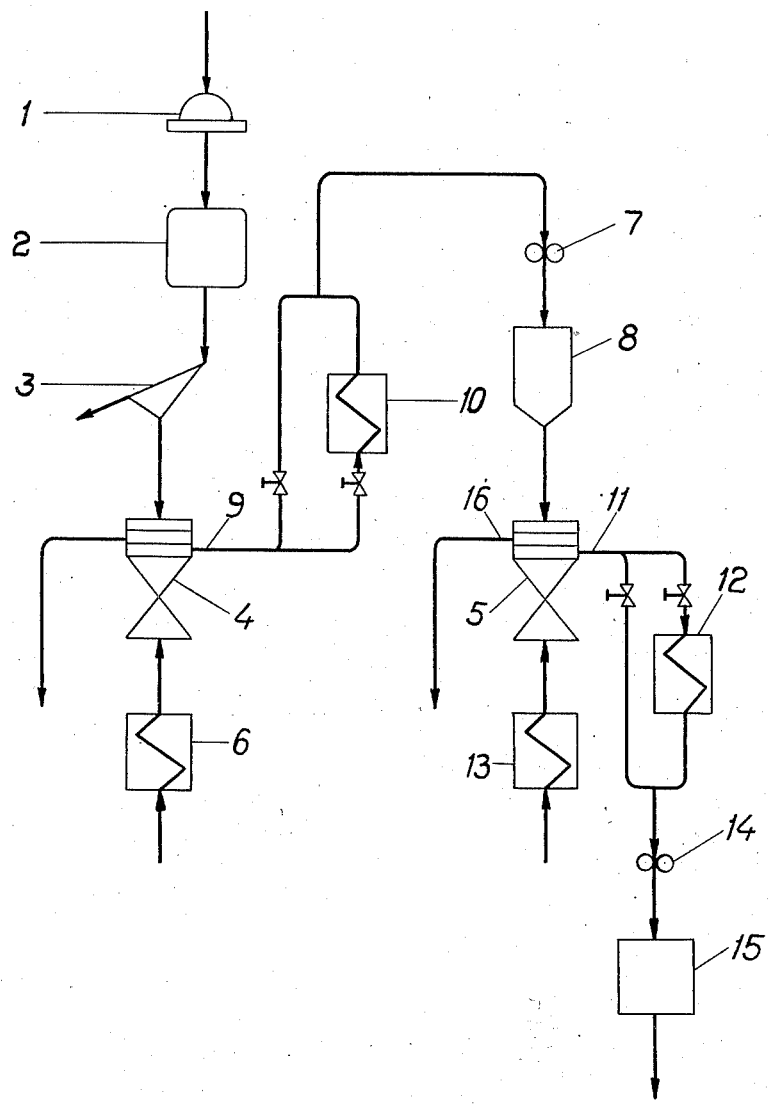

2,536,430

UNITED STATES PATENT OFFICE 2,536,430

CENTRIFUGAL SEPARATION OF STARCH

Carl Göran Eckers, Stockholm, Sweden, assignor to Aktiebolaget Separator, Stockholm, Sweden, a corporation of Sweden Application June 23, 1949, Serial No. 100,799
In Sweden June 26, 1948

6 Claims. (Cl. 127—69)

This invention relates to a method of manufacturing starch from cereals such as maize, rice, wheat, and the like.

Starch is generally manufactured by the following method: After grinding and grating the starch-bearing raw material, it is subjected to a sifting operation during which water is generally added. The object of the sifting is to remove the so-called pulp, consisting of coarse fibres and albuminous particles and some starch. The remainder or the so-called starch milk contains starch and liquid but also solid impurities lighter than the starch and consisting mainly of fine fibres and albuminous substances or protein. The starch may be recovered from the starch milk by several methods. For example, the impurities may first be removed by centrifuging the starch milk in a centrifugal separator, whereupon the remaining dissolved impurities are removed by washing the concentrate once or several times. In this manner a purified starch is produced which finally is de-watered and dried. According to another method, in which centrifugal separation is not used, the starch suspension is treated on a sloping table, the inclination of which is such that the starch granules sink to the bed of the table but the liquid runs off carrying with it the solid impurities which are lighter than the starch. The starch obtained in this manner may then be re-suspended in a fresh quantity of liquid and re-tabled. This procedure may be repeated once or several times, until the product has attained the desired purity.

Particularly in the production of starch from maize, rice, wheat, and the like, according to the above described methods, it is difficult to obtain a starch having a sufficiently low protein content, because the cereals contain considerable amounts of protein in solid form. A large proportion of the solid albumins adhere to the starch granules and this is chiefly responsible for the difficulties. It is true that in North America and South Africa some improved varieties of maize are grown which have a low content of protein and with which the protein may be easily separated from the starch; but on the other hand, the plate-corn cultivated in Argentina is much less favorable in this respect. It is to be noted that other factors also exercise an influence on the degree of difficulty in removing the protein. Such factors as the weather during the period of growth and the degree of ripeness of the cereals when they are reaped influence the finished product. Rain during the period of growth, especially during the latter part, and lack of over-ripeness of the cereals are among the factors which influence the quality of the starch favorably. A dry corn resulting from a prolonged period of storage tends to render the separation of the protein more difficult. Some starch factories which are situated in the immediate neighborhood of the corn fields and receive the corn directly from the fields, can pass it on to the manufacture at once, when the season of the year permits this. They are therefore in a particularly favorable position and can produce a starch having a low protein content.

With a view to enabling a manufacture of starch having a low protein content, certain measures have been proposed. It has been endeavored, for example, to facilitate the separation of the protein by effecting the tabling at an elevated temperature of the suspension. However, because of the relatively low concentration of the starch suspension, generally 6 to 12° Bé., the temperature cannot, for reasons of thermal economy, be kept as high as would be desirable. In practice, the temperature of the suspension is therefore kept between 30 and 40° C.

A purely mechanical working also influences the separation of the protein favorably. It has therefore been common practice to combine the above-mentioned increase of temperature with a mechanical working operation; that is, the temperature is raised prior to the grinding of the material, the grinding operation being of course in itself a mechanical working. According to another method, after tabling the material, a concentrated starch suspension of 20 to 22° Bé. is produce in combination with powerful agitation, that is, a mechanical working. Owing to this high concentration, it is possible to heat the suspension to a temperature of about 60° C., which is just below the gelatinization temperature, with relatively good thermal economy. The starch contained in the heated suspension is then left to settle in settling vats. By heating the suspension to the mentioned high temperature, an increase of the difference in specific gravity between the starch and the protein is obtained, so that the protein separates out more easily as a surface layer above the starch, which accumulates on the bottom of the settling vat. This surface layer may then be scraped off and thus separated from the starch.

However, even this method does not enable the desired complete removal of the protein adhering to the starch particles, partly because a thick bottom layer of starch is formed in the gravity separation in the vat, through which layer a fair proportion of the protein to be removed must pass on its way to the surface of the starch layer. This results in an increasing accumulation of protein in the starch layer, especially in the neighborhood of its upper surface. Since the proteins have a sticky consistency, they tend to stick together, which renders their upward passage toward the surface of the starch layer more difficult. Therefore, a considerable proportion of it cannot proceed to the surface but is enclosed in the starch layer some place below its upper surface. It is not possible, instead of this gravity separation in settling vats, to subject the highly concentrated and heated starch suspension to tabling, because the discharging quantity of liquid would be too small in relation to the amount of starch, and the velocity of the liquid would therefore be too low, so that the lighter impurities would not be entrained by the liquid current.

The principal object of the invention is to provide an improved method of producing starch from cereals, such as maize, rice, wheat, and the like.

According to the invention, a suspension of starch, protein, and fibres in a liquid is subjected to separation in two or more steps in centrifugal separators having continuous discharge of the separated products, a washing of the starch being effected during separation by means of a washing liquid fed into the separator. The method is characterized by an improvement which enables a more complete separation of the protein adhering to the starch granules than was possible with prior methods, and this is accomplished largely by carrying out the second stage separation, and any subsequent separation steps and de-watering operations, at a higher temperature than that at which the material is fed to the inlet in the first separating stage. The separating operations of all the stages are carried out in centrifugal separators of substantially the same construction and provided, at the bowl periphery, with openings for continuous discharge of one of the separated components. When the separation is effected in two stages, a starch-containing liquid of normal temperature, say 20 to 35° C., is fed into the first stage separator. Two components are withdrawn from this separator, one of which contains, in addition to liquid, the majority of the light solid impurities and part of the starch, and the other of which (the starch concentrate) contains the majority of the starch together with liquid and a small proportion of the impurities. After heating the latter component, it is fed into the second stage separator, from which two components also discharge, one of which is a starch concentrate. While maintaining its increased temperature, this starch concentrate is subjected in the usual manner to one or more de-watering treatments.

The heating of the starch concentrate from the first separating stage may be effected in a separate step after the concentrate has been discharged from the separator. However, I prefer to heat the concentrate in conjunction with the feeding of wash liquid to the first separating stage. The centrifugal separators are provided with tubes or other devices for supplying a washing liquid into the bowl, and the liquid is thus introduced into the bowl outside the separating zone, that is, in the concentrating chamber at the peripheral portion. The heating may be effected by using a washing liquid of such a high temperature that, after being mixed with the concentrate, the latter assumes the intended high temperature. In this manner, the additional advantage is obtained that the concentrate, after heating, is automatically subjected to a mechanical working by being thrown out of the discharge openings provided in the wall of the separator bowl.

Thus, the temperature of the washing liquid fed to the first separating stage is higher than that of the material to be separated in this step.

The washing liquid fed to the subsequent stages may also have a temperature higher than that of the material to be separated in the respective stages, or in any case higher than that of the material fed to the first separating stage. A lower temperature differential between the washing liquid and the suspension is required in the subsequent separating stages, since the purpose of the heating in these stages is mainly to compensate for any losses of heat during separation. However, to obtain thermal economy or safety against gelatinization, it may be desirable to heat the concentrate immediately after the first separation to less than the maximum permissible temperature, and then to increase it further in the following separating stages. The concentrate should be heated to a temperature immediately below the gelatinization temperature. For maize starch, it can be assumed that the gelatinization temperature in pure water is 61 to 62° C. The presence of chemicals often enables a reduction of this temperature. In the production of maize starch, for example, it is common practice to add chemicals, with a view to facilitating the separation of the protein so that this can take place at a lower temperature. Sometimes it may therefore be impossible, at least in the first separating stage, to raise the temperature to 60° C., which would have been possible if the starch had been suspended in pure water. However, the addition of chemicals entails higher production costs, and in practice it is therefore desirable to use only so much as is necessary for reaching a gelatinization temperature of not less than 40° C.

In the method according to the invention, the temperature of the starch concentrate is increased, simultaneously with or after the separation in the first stage, to above 40° C. but is at the same time kept 1 or 2° C. below the gelatinization temperature of the suspension under the prevailing conditions. When the heating is effected in the separator bowl by forcing hot wash liquid into it, or, as is also possible, by means of a heated wall in the sludge space of the bowl, the temperature may be raised somewhat above the gelatinization temperature. The gelatinization does not begin immediately, and the temperature of the concentrate leaving the separator bowl may be quickly lowered by cooling the receiving vessel for the starch concentrate. The simplest method of cooling is by aeration, that is, removing heat in the form of vapor. The temperature may also be raised after the separation by adding hot liquid or steam.

In the practice of the invention, the concentrate is subjected to mechanical working after each separation. As previously mentioned, a mechanical working is effected when the concentrate is thrown out through the discharge openings arranged in the bowl wall, and in certain circumstances this working may be very effective and make any additional working superfluous. But in case this working is insufficient, a separate working of the starch concentrate in one or more of the separating stages must be provided.

After the last stage separation, the starch concentrate is subjected to de-watering, for example, in a drying centrifuge or a filter. Some of the protein substances liberated prior to this procedure are very small and can therefore follow the liquid through the filter used for the de-watering, resulting in at least a partial withdrawal from the process of the protein liberated after the last separation.

In the accompanying drawing, the single illustration is a flow diagram of an installation suitable for practicing the method according to the invention.

Referring to the drawing, the numeral 1 designates a grating mill in which the starch-bearing raw material is grated. Sprouts are then removed in a separator 2 and the material is sifted on a shaking sieve 3 to remove coarse impurities which may otherwise cause difficulties in the subsequent centrifugal separation. This centrifugal separation is effected in two stages in centrifugal separators 4 and 5, which are provided with tubes or other devices for supplying a flushing liquid into the bowl and may be of the type described in my co-pending application Serial No. 31,854. The flushing liquid to be fed into separator 4 is preferably heated in a heater 6 to such a high temperature that, on being mixed with the starch concentrate separated in the separator, the concentrate is heated to the desired temperature, which will make it possible to carry out the separation in the next stage at the elevated temperature mentioned above. The starch concentrate from separator 4 is subjected to mechanical working in a device 7 and is then passed through a container 8 into the second separator 5. A heater 10 may be provided in the discharge path 9 for the concentrate from separator 4 and serves as a complementary device to, or a substitute for, the heater 6. A heating device 12 may likewise be provided in the discharge path 11 for the concentrate from separator 5, to serve as a complement to, or substitute for, the heater 13 for the flushing liquid. The object of heating the flushing liquid or the starch concentrate at this stage is mainly to compensate for the thermal loss occurring in this separator and in the passage of the starch concentrate to the subsequent stages of treatment, that is, a mechanical working in a device 14 and the final de-watering treatment at 15, which may be carried out in a drying centrifuge, a filter, or the like. The liquid component 16 withdrawn from the separator 5 at the same time as the starch concentrate, may be subjected to an addiitonal treatment for recovering the starch contained therein. This liquid may then be concentrated, if necessary, and then returned to the process at any desirable point.

I claim:

1. In the production of starch from cereals, such as maize, rice and wheat, in which a suspension of starch, protein and fibres in a liquid is subjected to separation treatment in at least two centrifugal separation stages each having continuous discharge of starch concentrate as one separated product and impurities as another separated product, in which the starch concentrate from the first stage is fed to the second stage, and in which the starch concentrate is washed in each separation stage by feeding a wash liquid into the centrifugal bowl of such stage, the improvement which comprises heating the starch concentrate obtained in the first stage separation, before it reaches the second separation stage, to a temperature substantially higher than that at which the starch suspension is fed to the first stage, whereby the starch concentrate undergoing separation in the second stage is at a higher temperature than said suspension fed to the first stage.

2. The improvement according to claim 1, comprising also the step of subjecting the starch concentrate from the final separation stage to de-watering treatment while maintaining the concentrate at a higher temperature than said suspension being fed to the first stage separation.

3. The improvement according to claim 1, in which said heating of the starch concentrate is effected at least partly by feeding said wash liquid into the first stage centrifugal bowl at a temperature higher than that of said suspension fed to the first stage.

4. In the production of starch from cereals, such as maize, rice and wheat, in which the suspension of starch, protein and fibres in a liquid is subjected to separation treatment in at least two centrifugal separation stages each having continuous discharge of starch concentrate as one separated product and impurities as the other separated product, in which the starch concentrate from the first stage is fed to the second stage, and in which the starch concentrate is washed in each separation stage by feeding a wash liquid into the centrifugal bowl of such stage, the improvement which comprises heating the starch concentrate obtained in the first stage separation to a temperature above 40° C. but not in excess of its gelatinization temperature, said heating being effected after said starch concentrate leaves the first stage but before it reaches the second stage, whereby the starch concentrate undergoing separation in the second stage is at a higher temperature than said suspension fed to the first stage.

5. In the production of starch from cereals, such as maize, rice and wheat, in which the suspension of starch, protein and fibres in a liquid is subjected to separation treatment in at least two centrifugal separation stages each having continuous discharge of starch concentrate as one separated product and impurities as the other separated product, in which the starch concentrate from the first stage is fed to the second stage, and in which the starch concentrate is washed in each separation stage by feeding a wash liquid into the centrifugal bowl of such starch, the improvement which comprises heating the starch concentrate obtained in the first stage separation to a temperature above its gelatinization temperature while the starch concentrate is in said first stage, and subjecting the concentrate discharged from the first stage to immediate cooling below the gelatinization temperature, the starch concentrate undergoing separation in the second stage being at a higher temperature than said suspension fed to the first stage.

6. The improvement according to claim 1, in which said starch concentrate obtained in the first stage separation is heated, before it reaches the second stage separation, to a temperature approximating its gelatinization temperature.

CARL GÖRAN ECKERS.

REFERENCES CITED

The following references are of record in the file of this patent:

UNITED STATES PATENTS

| Number | Name | Date |
| --- | --- | --- |
| 1,417,467 | Lenders et al. | May 23, 1922 |

FOREIGN PATENTS

| Number | Country | Date |
| --- | --- | --- |
| 823 | Great Britain | of 1879 |